No. 777,420. PATENTED DEC. 13, 1904.
W. HUNT.
SEWER TRAP.
APPLICATION FILED JAN. 25, 1904.
NO MODEL.
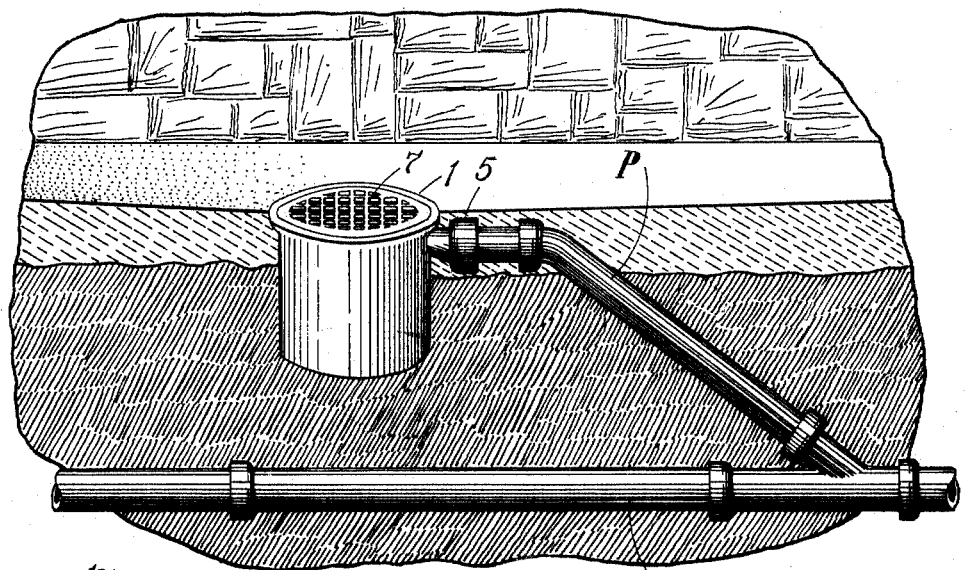
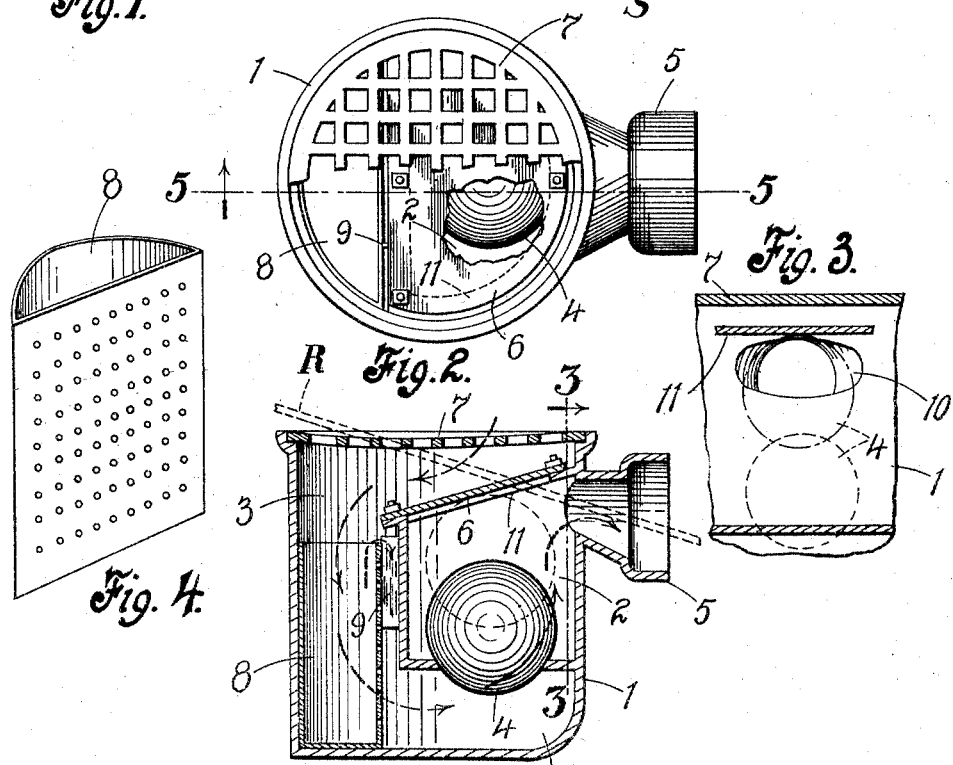
WITNESSES:
INVENTOR
William Hunt
BY
Emil Starek
ATTORNEY No. 777,420. Patented December 13, 1904.

UNITED STATES PATENT OFFICE.

WILLIAM HUNT, OF ST. LOUIS, MISSOURI.

SEWER-TRAP.

SPECIFICATION forming part of Letters Patent No. 777,420, dated December 13, 1904.

Application filed January 25, 1904. Serial No. 190,583. (No model.)

*To all whom it may concern:*

Be it known that I, WILLIAM HUNT, a citizen of the United States, residing at St. Louis, State of Missouri, have invented certain new and useful Improvements in Sewer-Traps, of which the following is a full, clear, and exact description, reference being had to the accompanying drawings, forming a part hereof.

My invention has relation to improvements in sewer-traps; and it consists in the novel construction of trap more fully set forth in the specification, and pointed out in the claim.

In the drawings, Figure 1 is a perspective of a cellar, showing my trap embedded therein and leading to the sewer-pipe. Fig. 2 is a top plan of the trap with portion of grating removed. Fig. 3 is a sectional detail on line 3 3 of Fig. 5, showing character of the discharge-opening at the base of the discharge-nozzle. Fig. 4 is a perspective view of the removable filter-cup, and Fig. 5 is a vertical section on line 5 5 of Fig. 2.

The object of my invention is to construct a trap which will effectively prevent the passage of sewer-gas therethrough, one which will readily permit the cleaning of the pipe connecting the same with the main sewer-pipe, thereby preventing the danger of the choking of the trap, one which shall be simple in construction, positive and reliable in its operation, and one possessing further and other advantages better apparent from a detailed description of the invention, which is as follows:

Referring to the drawings, 1 represents the body of the trap, the same being divided into two compartments 2 and 3, respectively. The bottom of the compartment 2 is raised above the bottom of the trap and constitutes a seat for the globe-valve or float 4. Said compartment 2 communicates directly with the discharge spout or nozzle 5, to which access may be had through the inclined top of the compartment 2 by the removal of the cover-plate 6. The upper open end of the trap is closed by the grating 7. Adapted to be received by the compartment 3 and be supported by the bottom of the trap is a percolating-cup 8, substantially semicylindrical in form, the curved wall thereof being adapted to bear against the corresponding curved wall of the trap, the plane wall of the cup being perforated and separated from the adjacent wall of the compartment 2 by ribs 9. The connection between the base of the nozzle 5 and the peripheral wall of the trap forms a horizontally-disposed elliptical opening 10, whose major axis is greater than the diameter of the float 4 and whose minor axis is less than said diameter, whereby as the rush of water carries the float against said opening the latter will not become choked, the water passing into the nozzle on either side of the float. (See dotted position of latter in Fig. 3.) The nozzle may be coupled to the main sewer-pipe S by a section of pipe P, as best shown in Fig. 1. The cover-plate 6 is secured to the flange 11, forming an integral part of the walls of the trap and compartment 2, by means of bolts, as shown, or otherwise.

As will be clearly obvious from a description of the operation of the trap, the float 4 constitutes a backwater-valve, it being impossible for the water or gases from the sewer to back up into the cellar of the house under any circumstances, since such back pressure will immediately seat the valve, and the compartment 2 being otherwise closed escape for such gases and water is impossible. For the majority of cases of course a float may not be necessary, the water ordinarily remaining in the trap being a sufficient seal against sewer-gas, though, of course, it could not resist backwaters under a great head or pressure.

The operation of the device may be briefly stated as follows: Referring to the arrows in Fig. 5, the water in the cellar drains through the grating 7, flowing partially along the inclined cover-plate 6 into the cup 8 and partially directly into said cup, whence it passes through the perforated walls of said cup into the compartment 3 below the float, the current discharged from the compartment 3 raising said float and flowing past it into the compartment 2 and through the latter into the nozzle 5. The perforated wall of the cup 8 acts in the nature of a filter, and should the dirt in time clog the perforations the water will simply overflow said wall, passing downward between and around the ribs 9. Of course the cup 8 is not indispensable and may be omitted. Should it be desirable to clean out the pipe P, a flexible rod R or wire may be inserted through the top of the trap, as indicated by the dotted position of said rod in Fig. 5, the cover-plate 6 and grating 7 being of course first removed for the purpose. Where the float 4 is omitted, sufficient water may be left in the trap to a suitable height above the base of the compartment 2, thereby effecting a water seal against sewer-gas, as is clearly obvious.

As seen from the drawings, in order to readily permit the insertion of the cleaning-rod R or wire the inclined top or cover 6 of the compartment 2 is substantially in line with or opposite to the discharge-spout 5, a feature to which I attach great importance.

It is to be understood that I may depart from specific details of construction here shown without in anywise affecting the nature or spirit of my invention. The cup 8 may be removed when necessary and cleaned, as is obvious.

Having described my invention, what I claim is—

A trap having an open top, a grating for normally closing the same, a closed compartment having a removable cover-plate formed in the trap, a discharge nozzle or opening leading from the said closed compartment, an open compartment discharging into the closed compartment through an opening formed in the bottom of the latter compartment, a float for normally closing said opening, a filter-cup located in the open compartment having a perforated wall separated a suitable distance from the adjacent wall of the closed compartment, and spacing-ribs separating said cup from the said wall, substantially as set forth.

In testimony whereof I affix my signature in presence of two witnesses.

WILLIAM HUNT.

Witnesses:
 Emil Starek,
 G. L. Belfry.